Patented Nov. 28, 1922.

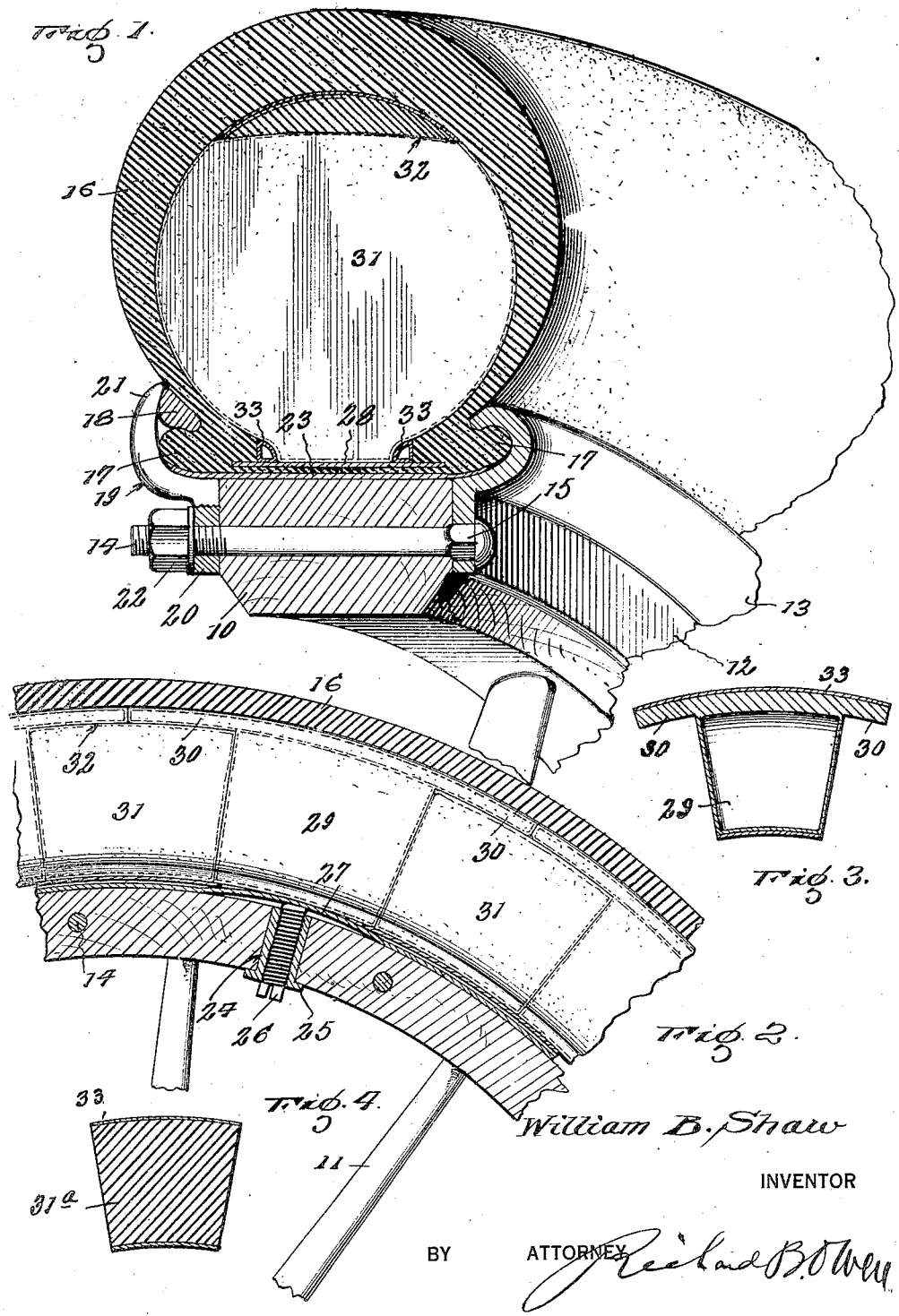

1,436,782

UNITED STATES PATENT OFFICE.

WILLIAM B. SHAW, OF NEW YORK, N. Y.

PNEUMATIC TIRE.

Application filed October 25, 1921. Serial No. 510,197.

*To all whom it may concern:*

Be it known that I, WILLIAM B. SHAW, citizen of the United States, residing at New York, in the county of New York and State of New York, have invented certain new and useful Improvements in Pneumatic Tires, of which the following is a specification.

This invention has relation to pneumatic tires for motor vehicles, and has for an object to provide a tire embodying a plurality of inflated elements which are enclosed with a casing to inflate the same, whereby the puncture of one of said elements will not result in the total deflation of the tire casing.

Another object of the invention is to provide a novel form of packing for a pneumatic tire of the character above set forth whereby to prevent the entrance of water, sand, etc., into the casing.

A still further object of the invention is to provide a novel means for holding a tire casing upon a wheel felly, whereby to permit the casing to be quickly demounted for replacement or repairs.

In addition to the foregoing this invention comprehends improvements in the details of construction and arrangement in parts to be hereinafter described and particularly set forth in the appended claims.

In the accompanying drawings in which similar and corresponding parts are designated by the same characters of reference throughout the several views in which they appear:

Figure 1 is a view in transverse section, partly in perspective, of a tire and wheel felly constructed in accordance with my invention.

Figure 2 is a fragmentary view in longitudinal section of the tire casing and associated parts.

Figure 3 is a view in section of one of the inflated elements.

Figure 4 is a cross section of a solid segment.

With reference to the drawings, 10 indicates a wheel felly and 11 the spokes. The felly is of the usual type and construction. Applied to the inner side of the felly is an annular member forming part of the demountable rim, and consisting of a flange portion 12 which bears against the side of the felly, and an overhanger clincher portion 13 designed to engage the bead of a clincher tire casing. The annular member is held upon the felly by means of a plurality of bolts 14, each of which is provided with a square portion 15 formed next to the head, said square portion entering a square opening in the rim so that said bolts may not turn. The bolts extend through the felly and project beyond the other side. The tire consists of a casing 16 of conventional type having a pair of clincher beads 17, one of which is engaged beneath the rim 13. A ring 18 is provided to engage over the other bead of the tire casing as shown in Figure 1. A plurality of clamping members 19 are provided, one for each bolt. Each clamping member is formed with an apertured portion 20 through which the bolt passes, and a ring engaging portion 21. A lock washer and nut 22 is then applied to each bolt to securely hold the clamping members in place.

Previous to the assembly of the parts just described, a band 23 of metal or other rigid material is encircled about the felly and the tire casing is designed to rest against said band. The band 23 is formed with a plurality of pairs of incisions extending in a circumferential direction. The felly is formed with a plurality of radial openings 24, in each of which there is inserted a sleeve 25. Each sleeve is internally threaded to receive a screw 26. The band 23 is located upon the felly so that the portion 27 between each pair of incisions will be located over one of the screws 26. Another band 28 is provided and is larger in diameter than the band 23 and is designed to encircle the latter in spaced relation thereto. The edges of said band are seated in recesses formed in the beads 17 of the casing. Located within the casing is a plurality of inflated elements of two different kinds, one kind indicated at 29 being segmental in form to fill the interior of the casing for a portion of its circumference. Each segment or element 29 is provided with a pair of oppositely extending extensions 30 which are the end portions of a strip of rubber or other solid material to which the sides of the inflated element are vulcanized. The segments 29 are arranged around the casing with the extensions 30 abutting one another, thus defining a space between each adjacent pair of segments, which space is filled with a segment 31, also inflated and having a flat top side 32 which engages the inner sides of the extensions 30. Thus, by the provision of the segments 29 and 31, the interior of the casing is completely filled. It will be noted that the abatement of the ends of the strips 30 provide a continuous armour around the tire to prevent the entrance of pointed articles into the inflated elements. Each inflated element 29 and 31 is covered with a casing of fabric 33 after the manner of a tennis ball. This casing constitutes a reinforcement to resist the outward pressure of the air within the element.

In use, the screws 26 are rotated so as to press the portions 27 of the inner band in an outward direction which will have the effect to force the tubes 33 apart and against the beads 17, and to close the joint between said beads by forcing the band 28 into said joint. Thus the entrance of water or sand into the casing is pevented. In the event that any one or a few of the segments 29 or 31 are punctured the remaining elements will provide sufficient inflation to the tire casing to enable the latter to support the weight of the vehicle without flattening.

As a modification I may substitute a solid segment 31ª as shown in Figure 4 for the inflated segments 31. In this manner alternate segments around the tire will be inflated and alternate solid. Thus, should any inflated segment be punctured the tire casing will be supported by the solid segment at each side of the punctured segment.

While I have illustrated and described my invention with some degree of particularity, I realize that in practice various alterations therein may be made. I therefore reserve the right and privilege of changing the form of the details of construction or otherwise altering the arrangement or the correlated parts without departing from the spirit of the invention or the scope of the appended claims.

Having thus described my invention, what I claim as new, and desire to secure by United States Letters Patent is:—

1. A pneumatic tire including a casing, a plurality of inflatable elements having oppositely extending extensions in contiguous relation about the inner circumference of the casing and defining a space between each adjacent pair thereof, and a plurality of resilient elements disposed within each of the said spaces and engaging the inner sides of the extensions.

2. A pneumatic tire including a casing, a plurality of inflatable elements having oppositely extending thickened extensions in contiguous relation about the inner circumference of the casing defining a space between each adjacent pair thereof and a plurality of resilient elements disposed within each of the said spaces and engaging the inner sides of the extensions and the sides of the inflatable elements.

In testimony whereof I affix my signature.

WILLIAM B. SHAW. [L. S.]